Feb. 6, 1940.	G. F. LINCKS	2,189,588
ELECTRIC SWITCHING DEVICE
Filed Dec. 2, 1937	2 Sheets-Sheet 1
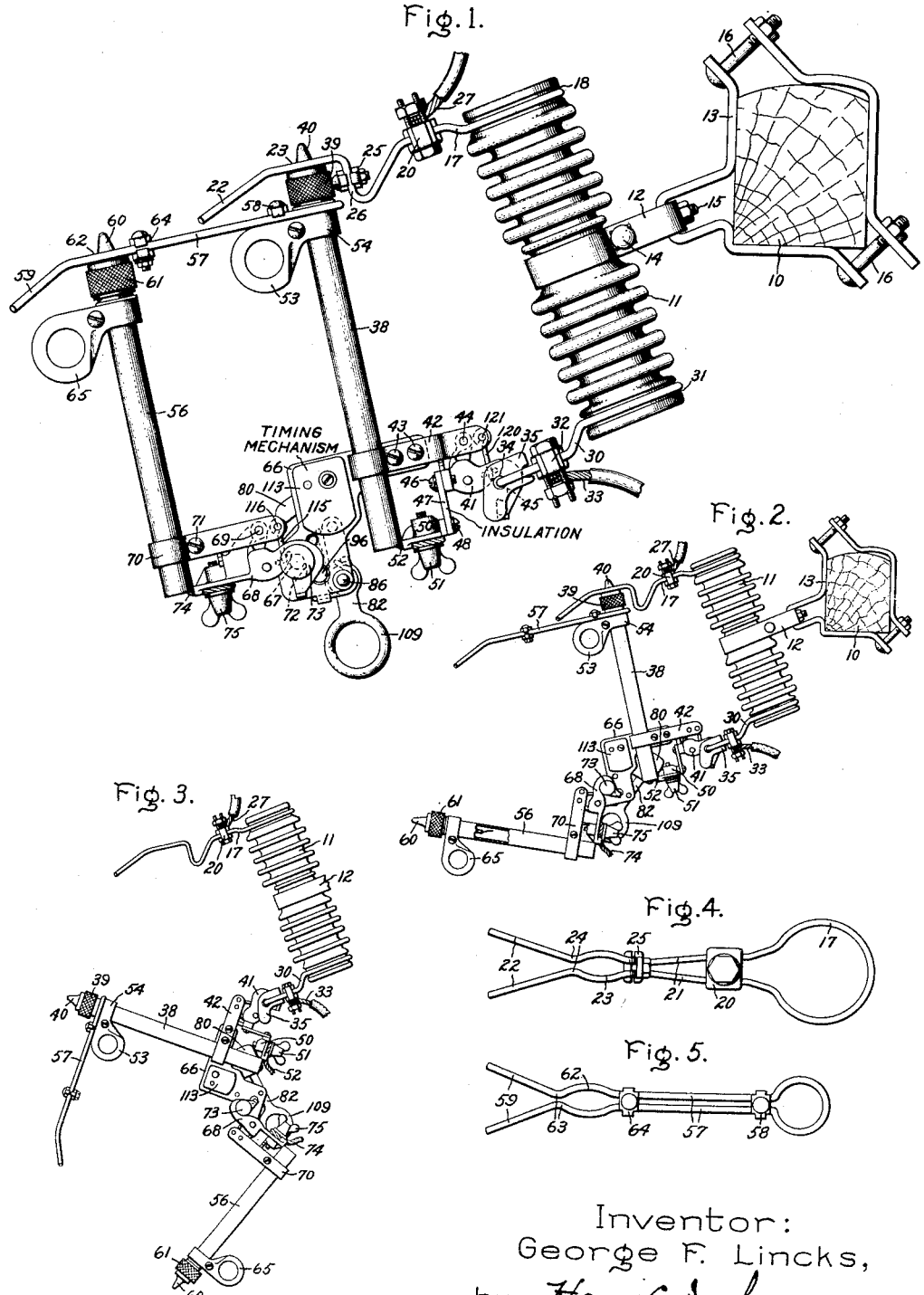
Inventor:
George F. Lincks,
by Harry E. Dunham
His Attorney.

Feb. 6, 1940.  G. F. LINCKS  2,189,588
ELECTRIC SWITCHING DEVICE
Filed Dec. 2, 1937  2 Sheets-Sheet 2
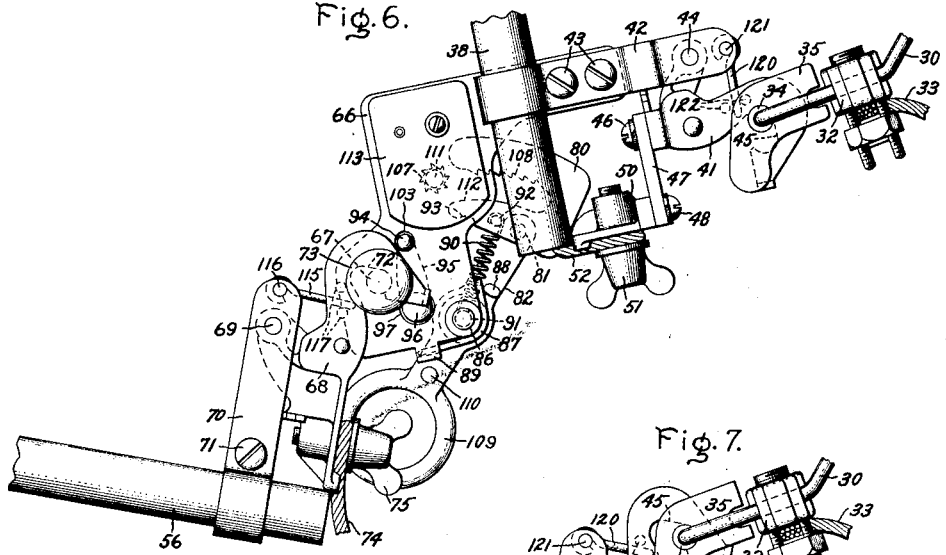
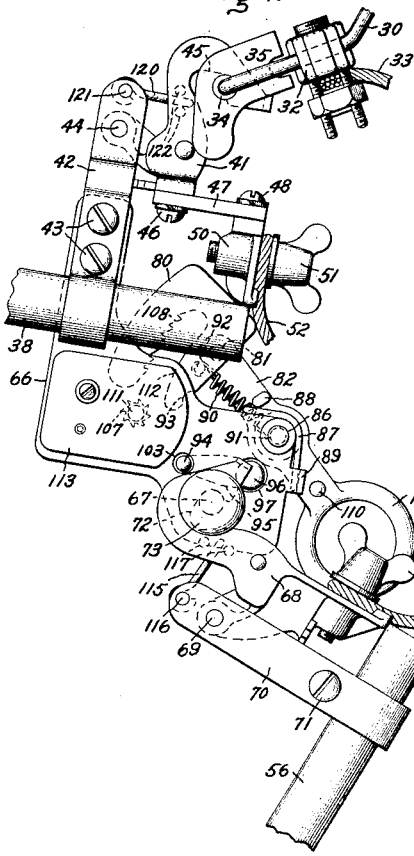
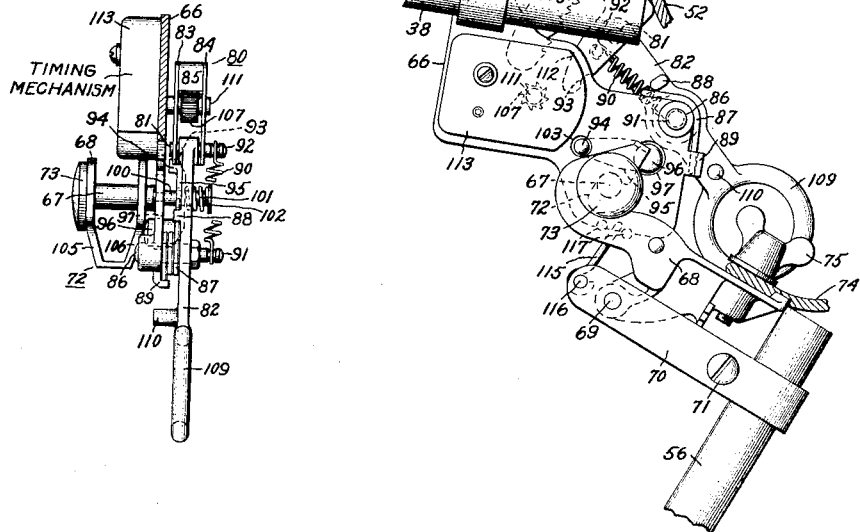
Inventor:
George F. Lincks,
by Harry E. Dunham
His Attorney.

Patented Feb. 6, 1940

2,189,588

UNITED STATES PATENT OFFICE 2,189,588

ELECTRIC SWITCHING DEVICE

George F. Lincks, Pittsfield, Mass., assignor to General Electric Company, a corporation of New York Application December 2, 1937, Serial No. 177,728

12 Claims. (Cl. 200—126)

The present invention relates to electric switching devices, more particularly of the circuit reclosing type, and has for an object the provision of improvements in the construction and arrangement of parts of a circuit reclosing switching device of the type wherein an individual switching element of a plurality of switching elements may be switched into and out of circuit closing position without disturbing the positioning of other of the switching elements while movement of the individual switching element out of circuit closing position is effective to cause reclosure of the circuit through another of the switching elements.

Another object of the invention is the provision of an improved circuit reclosing switching device employing a plurality of switching elements, at least one of which is of the fused type, wherein operation of the fused switching element automatically effects movement thereof to open circuit position and reclosure of the circuit through another one of the switching elements, while movement of a master one of the switching elements to open circuit position effects movement of all of the switching elements to open circuit position.

A further object of the invention is the provision of a circuit reclosing switching device employing a plurality of switching elements, certain of which are of the fused type, wherein one of the switching elements, which may be of the fused type, is employed as the main connecting and disconnecting means for the whole switching device.

A still further object of the invention is the provision of an improved circuit reclosing switching device employing a plurality of switching elements, at least one of which is of the fused type, wherein a master switching element is employed as the support for the fused switching element and circuit reclosing mechanism.

It is an object of the invention also to provide improved construction and arrangement of parts in a circuit reclosing fuse cutout of the drop-out type.

Other objects and the details of that which I believe to be novel and my invention will become apparent from the following description and the claims appended thereto taken in conjunction with the accompanying drawings wherein an exemplary form of switching device embodying the present invention is illustrated.

In the drawings Fig. 1 shows the switching elements of an exemplary switching device in their closed circuit positions; Fig. 2 shows the relative positions of the switching elements after operation and drop-out of one of the elements; Fig. 3 shows the relative positions of the switching elements after all of them have operated and dropped out; Figs. 4 and 5 are plan views of two of the contacts employed in the illustrated switching device; Fig. 6 is an enlarged detail view of certain of the parts corresponding to their positions shown in Fig. 2; Fig. 7 is an enlarged detail view of certain of the parts corresponding to their positions shown in Fig. 3; and Fig. 8 is a detail view of the circuit reclosing mechanism as it would be seen by one looking from the right at the device of Fig. 1.

Referring to the drawings, 10 indicates a cross-arm which is secured to a pole, not shown, of a transmission line and on which is mounted an insulator 11 by means of a strap 12 and a two-part clamp 13. Strap 12 is secured tightly in surrounding relation to a reduced middle portion of insulator 11 by means of a bolt 14 and is fastened to one part of clamp 13 by means of a bolt 15. The two parts of clamp 13 are disposed respectively on opposite sides of cross-arm 10 and connected tightly together by means of bolts 16. At the upper end of insulator 11 is a contact 17 which consists of a rod of copper or other good conductivity metal bent around the upper end of the insulator and seated in an annular groove 18. As will be seen best from the plan view of Fig. 4, contact 17 is secured to the insulator by means of a combined clamp and connector 20 and has two arms 21 extending outwardly in parallel relationship and provided at their outer ends with divergent horns 22 which serve to guide the upper end of a switching element, hereinafter described, into a latching seat 23 formed by the relatively converging portions 24 of the arms. The outer ends of the arms are prevented from spreading apart by means of a clamp 25 which is disposed on the downwardly bent portion 26 of the arms, as best shown in Fig. 1. The combined clamp and connector 20 serves for the attachment of a line lead 27 to upper contact 17. At the lower end of insulator 11 is a second contact 30 also comprised of a rod of copper or other good conductivity metal which is bent around the insulator and tightly secured in an annular groove 31 in the insulator by means of a combined clamp and connector 32 which also serves for the attachment of the line lead 33 to the lower contact. The rod forming the lower contact 30 has its free ends turned inwardly and extending into a metal sleeve 34 which serves as a pivot for a switching element, as will be described hereinafter. Guide plates 35, one of which is seen in the drawings, are mounted in spaced relationship on sleeve 34 for receiving therebetween and guiding a toggle lever, also described hereinafter. It is to be understood that the present invention is not limited to the details of the illustrated support and stationary contacts which are shown merely as an exemplary form of switch supporting structure primarily designed for a single fuse holder or switching unit in a non-reclosing installation, yet which supporting structure may be utilized without change for supporting a circuit reclosing fuse unit of the type hereinafter described for conversion of a non-reclosing installation to a circuit reclosing installation. The general formation of the particular stationary contacts illustrated, the manner of mounting thereof, and the details of clamps 20 and 32 form part of the subject matter of United States Letters Patent No. 2,025,563, issued December 24, 1935, in the name of R. S. Bennett and assigned to the assignee of the present invention, while certain specific details of the formation of upper contact 17 form part of the subject matter of United States Letters Patent No. 2,119,388, issued May 31, 1938, in the name of B. R. Hermann and also assigned to the assignee of the present invention.

A switching element including a fuse holder 38 is pivotally mounted on lower stationary contact 30 for connection of a fused link in the holder between the two stationary contacts. The upper end of the fuse holder is closed by means of a removable contact cap 39 adapted to provide a terminal for the upper end of a fuse link in the fuse holder and having a conical projection 40 adapted to be received in the latching seat 23 of upper stationary contact 17. The particular form of contact cap 39 also is not part of the present invention but is part of the subject matter of the above-identified patent of B. R. Hermann, in which patent the manner of cooperation of conical projection 40 with upper contact 17 and the advantageous results derived therefrom are set forth in detail. Fuse holder 38 is pivotally mounted on the sleeve 34 of lower contact 30 by means of a toggle lever 41 and a fuse holder support 42. Support 42 is in the form of a strap clamped about fuse holder 38 adjacent the lower end thereof by means of bolts 43. Toggle lever 41 is connected to the outwardly projecting arms of this strap by means of pivot pin 44 and has a hook-shaped portion 45 arranged to engage sleeve 34 and to be received between guide plates 35. Secured to the toggle lever by means of screw 46 and depending therefrom is a member 47 of insulation material upon the lower end of which is mounted, by means of a screw 48, a fuse terminal 50. This terminal is arranged to have clamped thereto, by means of a thumb-screw 51 or other suitable means, the outwardly extending portion 52 of a fuse link in fuse holder 38. While the fuse link in fuse holder 38 is intact, lever 41 is held in the position illustrated in Figs. 1 and 2 relative to the fuse holder by the clamped fuse link extension 52, the upper end of the fuse link being anchored in the upper end of the fuse holder. Under these conditions, the switching element including fuse holder 38, support 42 and lever 41, may be opened or closed manually either by hand or a switch stick, not shown. For this purpose there is provided an eyelet handle 53 carried by a metal sleeve 54 clamped on the fuse holder adjacent the upper end thereof. However, when fuse holder 38 is in closed position and the other parts of the switching device are in their positions illustrated in Fig. 1, the fuse link in the fuse holder is not connected between contacts 17 and 30 since fuse link extension 52 is insulated from lever 41 and contact 30 by means of member 47.

A second switching element, including a second fuse holder 56, and a circuit reclosing mechanism, both of which are now to be described, are mounted on the first switching element, hereinbefore described. At the upper end of the first fuse holder 38 is mounted a contact terminal 57 which is comprised of a rod of copper or other good conducting metal bent around the fuse holder in electrically conductive relation with contact cap 39 and secured in position by a clamp 58. As best shown in Fig. 5, contact 57 has two arms projecting outwardly in parallel extending relationship and provided at their outer ends with divergent horns 59 for guiding the conical projection 60 of the contact cap 61 on the upper end of fuse holder 56 into a latching seat 62 formed by converging portions 63 of the arms of contact 57. The outer ends of the arms of contact 57 are prevented from spreading by a clamp 64 which serves also as a back stop for conical projection 60 upon recoil of holder 56 due to operation of the fuse link therein. Fastened to fuse holder 56 just below contact cap 61 is an eyelet handle 65 which may be grasped manually or engaged by a suitable form of switch stick for swinging the fuse holder into and out of closed position. In order pivotally to support fuse holder 56, there is provided an electrically conductive supporting plate 66 which is secured to the strap 42 on fuse holder 38 by means of the bolts 43 and which plate has a hinge pin 67 adapted to be engaged by and to support a metal toggle lever 68. This toggle lever is connected, by means of a pivot pin 69, to the outwardly projecting arms of a metal strap 70 clamped on the lower end of fuse holder 56 by means of bolt 71. Toggle lever 68 has a hook-shaped portion 72 for detachable engagement with hinge pin 67 and the hinge pin has a flanged head 73 for preventing sidewise displacement of the toggle lever on the hinge pin. Lever 68 normally is held in the position illustrated in Fig. 1, relative to holder 56, by means of a lower outwardly extending portion 74 of a fuse link which has its upper end anchored in fuse holder 56, the outwardly extending fuse link portion 74 being clamped to toggle lever 68 by means of thumbscrew 75. With the parts of the switching device in their positions illustrated in Fig. 1, the fuse link in holder 38 is electrically isolated from lower stationary contact 30, as previously pointed out, while the fuse link in holder 56 is electrically connected between stationary contacts 17 and 30. The circuit extends from contact 17 through contact cap 39, contact terminal 57, contact cap 61, the fuse link in holder 56, fuse link extension 74, lever 68, hinge pin 67, supporting plate 66, strap 42, toggle lever 41, and sleeve 34 to lower stationary contact 30. Under these conditions, the switching element or unit including holder 56, strap 70 and lever 68 may be swung into or out of its closed position illustrated in Fig. 1 without disturbing the positioning of the switching element including holder 38. Or, with holder 56 in closed position, holder 38 and its associated parts may be operated as a disconnect switch completely to open the circuit between stationary contacts 17 and 30.

The details of the circuit reclosing mechanism employed in the switching device of the present invention will be seen best in the views of Figs. 6, 7, and 8. This mechanism includes a transfer contact, inclusively designated 80, which is pivotally supported by means of a pin 81 on the upper end of a rotatably mounted switch arm 82. Contact 80 is comprised of a pair of plates 83 and 84 held in parallel spaced apart relation at the top by means of a block 85 and at the bottom by means of pin 81. Switching arm 82 is rotatable on a pin 86 carried by electrically conductive supporting plate 66 and is biased for clockwise rotation, as viewed in the drawings, by a helical spring 87 one end of which engages a boss 88 on the switching arm and the other end of which engages a flange 89 on plate 66. Contact 80 is biased for counter-clockwise rotation relative to arm 82 and about pin 81 by means of a tension spring 90 one end of which is connected to an outwardly projecting end 91 of pin 86, which supports arm 82, and the other end of which spring 90 is attached to a pin 92 carried by contact 80 at one side of pivot pin 81. Thus spring 90 tends to produce the counter-clockwise rotation of contact 80 relative to arm 82 by pulling down on the contact, and the relative movement between contact 80 and arm 82 is limited by engagement of pin 92 with arm 82 as shown in Figs. 6 and 7. The left-hand plate 83, as viewed in Fig. 8, of contact 80 has a notch 93 arranged normally to be engaged by a small boss 94 carried by a trip lock 95 for maintaining arm 82 normally in a substantially vertical position and contact 80 in open circuit position relative to terminal 50 as shown in Fig. 1. The body portion of trip lock 95 extends approximately vertically and has on its lower end a large boss 96 arranged to project through an opening 97 in supporting plate 66, as best shown in Fig. 8. Also, the body portion of trip lock 95 is slidably mounted on a pin 100 carried by supporting plate 66 and is biased for movement toward the left, as viewed in Fig. 8, by means of a helical spring 101, the outer end of which bears against the outer flanged end 102 of pin 100. When trip lock 95 is pressed to the left by spring 101, the smaller boss 94 on the upper end thereof projects through an opening 103 in supporting plate 66, as indicated in Fig. 6, and is disengaged from notch 93 of contact 80. However, the trip lock 95 is arranged normally to be maintained in its right-hand position, illustrated in Fig. 8, by engagement of toggle lever 68 with the outer end of boss 96. The hooked portion 72 of lever 68 is of substantially U-shape with the spaced arms 105 and 106 thereof converging toward each other toward the end of the hook-shaped portion, as shown in Fig. 8. When fuse holder 56 and toggle lever 68 are in their positions illustrated in Fig. 1, the arm 106 of the U-shaped portion of lever 68 bears against the outer end of boss 96 to hold trip lock 95 in its right-hand position, as viewed in Fig. 8, wherein boss 94 engages notch 93 of contact 80 to maintain the contact in open circuit position and arm 82 in a substantially vertical position. Under these circumstances, the teeth of a ratchet wheel 107 engage a toothed underneath surface 108 of block 85 which forms a portion of contact 80. It will be noted that the teeth of ratchet wheel 107 slant to the left while the teeth of block 85 slant to the right. With this arrangement contact 80 may be moved to the left, as viewed in the drawings, without effecting rotation of ratchet wheel 107 since the flexible connection between contact 80 and arm 82 and the relative slant of the teeth permit the toothed surface 108 to slide over the teeth of ratchet 107. However, when force is applied to arm 82 to move contact 80 to the right, the downward pull of spring 90 causes toothed surface 108 to mesh firmly with the teeth of ratchet 107 so that contact 80 can not move to the right without accompanying rotation of the ratchet wheel. An eyelet handle 109 is provided on the lower end of arm 82 for manual rotation of the arm in a counter-clockwise direction. In order to prevent arm 82 from rotating too far in a clockwise direction under the influence of spring 87 when terminal 50 is not in position to be engaged by contact 80, there is provided on arm 82 a boss 110 arranged to engage flange 89 on the lower end of supporting plate 66. The ratchet wheel 107 is mounted on a shaft 111 which is arranged to be received in slots 112 disposed just below block 85 in the spaced apart plates 83 and 84 of contact 80. Shaft 111 extends through supporting plate 66 into a casing 113, mounted on the opposite side of the supporting plate 66, and connects with a timing mechanism disposed in the casing. The details of this timing mechanism are not shown since they do not go to the essence of the present invention and any suitable timing mechanism may be employed, such as for example the inertia type mechanical escapement disclosed and described in detail in United States Letters Patent No. 2,165,015, issued July 4, 1939, in the name of L. P. Sohles, and assigned to the assignee of the present invention.

With an understanding of the relationship of the various parts of the switching device from the foregoing description, the installation and operation of the device may now be described. After installation of fuse links in fuse holders 38 and 56 in the usual manner and fastening of the fuse link extensions 52 and 74 to fuse terminal 50 and lever 68 respectively, lever 68 is mounted on hinge pin 67 and fuse holder 56 rotated until the conical projection 60 of contact cap 61 is latched in seat 62 of contact terminal 57. As fuse holder 56 is rotated into the position illustrated in Fig. 1, relative to fuse holder 38, the tapered hook portion of lever 68 engages boss 96 to force trip lock 95 to the right to its position illustrated in Fig. 8 wherein it is held by the arm 106 of lever 68 so long as fuse holder 56 is latched in closed position. Arm 82 then is rotated in a counter-clockwise direction by means of handle 109, thereby causing contact 80 to move to the left with the toothed surface 108 of block 85 sliding over the teeth of ratchet wheel 107 due to the flexible mounting of contact 80 on arm 82, as previously described. When contact 80 has been moved sufficiently far to the left, boss 94 of trip lock 95 engages notch 93 to hold the contact in open circuit position. Thus, the circuit reclosing mechanism is set for operation. The supporting switching element, including fuse holder 38, may then be mounted on lower stationary contact 30 by engagement of the hook-shaped portion 45 of toggle lever 41 with sleeve 34, and the whole assembly may be rotated into the position illustrated in Fig. 1 wherein the conical projection 40 of the terminal cap 39 on the upper end of fuse holder 38 is latched in seat 23 of upper stationary contact 17. It will of course be understood that these various steps in the installation may be accomplished in different order from that described, as for example the switching element including fuse holder 38 may be first installed in closed position and then the switching element including fuse holder 56 mounted thereon and the circuit reclosing mechanism set.

With the parts in their positions illustrated in Fig. 1, the fuse link in fuse holder 56 is connected between stationary contacts 17 and 30 while the lower end of the fuse link in fuse holder 38 is isolated from lower stationary contact 30, as previously described. Under these circumstances, fuse holder 38 may be rotated manually, either by hand or by means of a switch stick, to open circuit position so as to open the circuit of which contacts 17 and 30 form a part, while the fuse links in both fuse holders are still intact. On the other hand, fuse holder 38 may be left in closed position and fuse holder 56 rotated to open circuit position while the fuse links in both the holders still are intact. This latter operation will cause the tapered hook-shaped portion of toggle lever 68 to become disengaged from boss 96 so that trip lock 95 may move to the left, as viewed in Fig. 8, under the influence of spring 101. Thereupon boss 94 becomes disengaged from notch 93 so that spring 87 may become effective to rotate arm 82 and contact 80 in a clockwise direction. This clockwise movement is delayed so long as the toothed surface 108 engages the teeth of ratchet 107, the contact being pulled down by spring 90 to maintain this engagement, as previously described. The extent of toothed surface 108 is such that when contact 80 reaches a point at a predetermined distance from fuse terminal 50, the contact will be released from ratchet 107 to permit snap-action movement of the contact under the influence of spring 87 into engagement with fuse terminal 50 thereby to complete the electric connection of the fuse link in fuse holder 38 between stationary contacts 17 and 30. The final snap-action movement of the contact prevents the drawing of an arc between the contact and terminal 50. The reclosed circuit extends from upper stationary contact 17 through contact cap 39, the fuse link in fuse holder 38, fuse link extension 52, terminal 50, contact 80, arm 82, pivot 86, supporting plate 66, strap 42, toggle lever 41, and sleeve 34, to lower stationary contact 30.

With the parts of the switching device in their positions illustrated in Fig. 1, the same circuit reclosing operation described in the preceding paragraph takes place when the fuse link in fuse holder 56 ruptures due to a fault current. Under these circumstances, fuse link extension 74 is released to permit collapse of the supporting toggle mechanism of which lever 68 forms a part. Lever 68 then swings downwardly about hinge pin 67 so that fuse holder 56 may move downwardly until conical projection 60 disengages from contact 57. Fuse holder 56 then swings to its open position illustrated in Fig. 2. The downward movement of toggle lever 68 about hinge pin 67 releases the circuit reclosing mechanism for operation to reclose the circuit through the fuse link in fuse holder 38 by engagement of contact 80 with terminal 50 in the manner described in the preceding paragraph. The delay in the movement of contact 80 to circuit closing position, due to the action of the timing mechanism in casing 113, provides for clearing of a partially sustained but temporary fault after clearing of the circuit in fuse holder 56 and before the circuit is reclosed through the fuse link in fuse holder 38, so that the fuse links in both of the holders will not operate on the same temporary fault. The switching element including fuse holder 56 is prevented from jumping off of hinge lever 67 by means of a keeper 115 which is pivotally supported on the outer end of the arms of strap 70 by means of a pin 116. This keeper extends downwardly between two guide pins 117, and upon collapse of the toggle mechanism the keeper moves downwardly over the opening in the hook-shaped portion of lever 68 to prevent disengagement of the lever from hinge pin 67. This keeper is not a part of the present invention, but forms a part of the subject matter of United States Letters Patent No. 1,973,265, issued September 11, 1934, in the name of C. J. B. Olsen and myself, which said Letters Patent are assigned to the assignee of the present invention.

With the parts of the switching device in their positions illustrated in Fig. 2, an opportunity is afforded for removal of the outer switching element for refusing of fuse holder 56 while the circuit is still protected by an intact fuse link in fuse holder 38. Removal of the outer switching element may be readily accomplished by lifting up on fuse holder 56 and disengaging lever 68 from hinge pin 67. In case of continuing or recurring fault, the fuse link in fuse holder 38 ruptures to release fuse link extension 52 so that the toggle mechanism including lever 41 collapses. This permits holder 38 to move downwardly to disengage conical projection 40 from latching seat 23 of contact 17, whereupon holder 38 swings to its dropped-out position shown in Fig. 3. Lever 41 is prevented from jumping off of sleeve 34 during the drop-out operation, in a manner similar to that described in connection with lever 68, by means of a keeper 120 pivoted at 121 on strap 42 and extending down between guide pins 122 to close the opening in the hook-shaped portion of lever 41. Removal of the inner switching element may be accomplished for refusing of holder 38 in the same manner as described in connection with the outer switching element.

From the foregoing description, it will be evident that the present invention is not limited to the specific details of the exemplary embodiment illustrated and that modifications within the scope of an ordinary skilled mechanic may be made to adapt the illustrated embodiment to different conditions met with in practice. For example, an electrically conductive disconnecting blade may be employed instead of a fuse holder in the inner switching element, care being taken to provide for insulation normally of the lower end of the blade from the lower contact. Also, another switching element, like the inner switching element and having circuit reclosing mechanism as illustrated and hereinbefore described, may be mounted on the inner switching element and employed to support a third switching element, thereby to provide for more than one circuit reclosure. Hence, it is intended to cover by the appended claims such modifications or other embodiments as do not depart from the true spirit and scope of the present invention.

What I claim as new and desire to secure by Letters Patent of the United States is:

1. In an electric switching device, a pair of contacts, a switching element supported removably in closed position relative to said contacts and having a pair of spaced terminals one of which is electrically connected with one of said contacts and the other of which terminals is electrically isolated from the other of said contacts, a second pair of terminals supported by said element in insulated spaced relationship and electrically connected respectively with said contacts, a fused switching element, means supporting said fused element on said first element for removable connection between said second terminals, said fused element being movable to an open position without movement of said first element from its said closed position, and switching mechanism automatically operative upon movement of said fused element to open position for completing an electric connection between the said other terminal of said first pair of terminals and said other of said contacts.

2. In an electric switching device, a pair of contacts, a switching element supported removably in closed position relative to said contacts and having a pair of spaced terminals one of which is electrically connected with one of said contacts and the other of which terminals is electrically isolated from the other of said contacts, a second pair of terminals supported by said element in insulated spaced relationship and electrically connected respectively with said contacts, a fused switching element, means supporting said fused element on said first element for removable connection between said second terminals, said fused element being movable to an open position without movement of said first element from its said closed position, and switching mechanism supported by one of said elements and automatically operative upon movement of said fused element to open position for completing an electric connection between the said other terminal of said first pair of terminals and said other of said contacts.

3. In an electric switching device, a pair of contacts, a switching element supported removably in closed position relative to said contacts and having a pair of spaced terminals one of which is electrically connected with one of said contacts and the other of which terminals is electrically isolated from the other of said contacts, a second pair of terminals supported by said element in insulated spaced relationship and electrically connected respectively with said contacts, a fused switching element, means supporting said fused element on said first element for pivotal movement of said fused element relative to said first element into and out of a closed position wherein said fused element is connected between said second pair of terminals, means operative responsively to operation of said fused element when the latter is in closed position for effecting movement of said fused element to open position, and switching mechanism releasable by movement of said fused element from its said closed position for automatically completing an electric connection of said other of said first pair of terminals with said other of said contacts.

4. In an electric switching device, a supporting structure having spaced stationary contacts, a pair of switching units, supporting means for said units removably mounted on said supporting structure, said supporting means being arranged for pivoting of one of said units relative to said supporting structure and for pivoting of the other of said units relative to said one unit, said one unit including an electrically conductive element and said other unit including a fusible electrically conductive element, means for releasably maintaining said units in operative positions relative to each other and to said supporting structure, means operative when said units are in said operative positions for electrically connecting one end of each of said conductive elements with one of said contacts and for electrically connecting the other end of said fusible conductive element with the other of said contacts, said one unit being movable out of operative position to effect disconnection of both of said conductive elements from said one contact, said other unit being movable out of operative position without effecting movement of said one unit out of operative position, and circuit reclosing mechanism carried by said supporting means operative responsively to movement of said other unit out of operative position when said one unit is in operative position for completing an electric connection between said other contact and the other end of the conductive element of said one unit.

5. A unitary switch element comprising in combination, a switch member having a pair of contact engaging terminals and also a third terminal insulated from one of said pair of terminals, said member including a conductor electrically connected between said third terminal and the other of said pair of terminals, switching mechanism forming part of said unitary element and including a contact operable to complete connection between said third terminal and said other of said pair of terminals, means for releasably restraining said contact in open position, means provided for removable mounting of said unitary element on a switch supporting structure with said pair of terminals respectively engaging spaced contacts of the supporting structure, and means provided for movably supporting a second switch member on said unitary element, said last means providing for movement of such second switch member relative to said first switch member to and from a position connected between said pair of terminals.

6. A unitary switch element for use in an electric switching device including a supporting structure and spaced contacts, said element comprising a fuse holder, a pair of contact engaging terminals carried by said holder in insulated spaced relationship, one of said terminals including a hinge lever for pivotally supporting said holder on a supporting structure, a third terminal supported by said lever in electrically insulated relationship thereto, means for securing to said third terminal one end of a fuse link in said holder for releasably latching said lever in predetermined relation to said holder, and switching mechanism mechanically connected to said holder including a contact movable to a closed position for completing an electric connection between said third terminal and said one of said pair of terminals and latching means for releasably maintaining said contact in an open position.

7. In an electric switching device, a pair of contacts, a switching element, means normally supporting said switching element in closed position relative to said contacts, said element having a first pair of terminals one of which is normally electrically connected with one of said contacts and the other of which terminals is normally electrically isolated from the other of said contacts, a second pair of terminals supported by said element in insulated spaced relationship and electrically connected respectively with said contacts, a fuse holder having a terminal at one end thereof, means pivotally supporting said holder on one of said second pair of terminals for movement of the holder into a closed position wherein said holder terminal engages the other of said second pair of terminals, a fuse link in said holder electrically connected at one end with said holder terminal and electrically connected at the other end with said one of said second pair of terminals, means operative upon rupture of said fuse link for effecting movement of said holder to open position relative to said other of said second pair of terminals, and circuit reclosing mechanism supported by said switching element and operative automatically upon movement of said holder from its said closed position for completing an electric connection between said other of said first pair of terminals and said other of said contacts.

8. In an electric switching device, an insulating support having a pair of stationary contacts, a first switching element including a first fuse holder, means removably supporting said first element on said support in closed position relative to said stationary contacts for connection of a fuse link in said first holder between the stationary contacts, a pair of terminals carried by said first element in insulated spaced relationship, means for electrically connecting said terminals respectively with said pair of stationary contacts, a second switching element including a second fuse holder, means removably supporting said second element on said first element in closed position relative to said terminals for connection of a fuse link in said second holder between said terminals, and circuit reclosing mechanism carried by one of said elements and operable responsively to operation of a fuse link in said second holder for completing an electric connection of a fuse link in said first holder between said stationary contacts.

9. In an electric switching device, an insulating support having a pair of spaced contacts, a switching element mounted on said support and having a pair of terminals one of which is normally electrically connected with one of said contacts and the other of which terminals is normally electrically isolated from the other of said contacts, a supporting member and a second pair of terminals carried by said element, means for electrically connecting said second pair of terminals respectively with said contacts, a fuse holder, means including a hinge lever for pivotally mounting said holder on said supporting member, means for latching said holder in position for connection of a fuse link therein between said second pair of terminals, said latching means being operative to release said holder for movement thereof to an open position upon rupture of a fuse link in the holder, and circuit reclosing mechanism releasable by movement of said lever relative to said supporting member due to movement of said holder toward open position for completing an electric connection between said other of said first pair of terminals and said other of said contacts thereby to connect said switching element between said contacts.

10. In an electric switching device, an upper and a lower contact, a fuse holder having a first terminal at the upper end thereof, means including a toggle lever pivotally supporting said holder on said lower contact and normally releasably latched by a fuse link in said holder to maintain said holder in closed position with said terminal engaging said upper contact, said fuse link having one end electrically connected with said terminal and the other end electrically isolated from said lower contact, a second terminal carried by said holder in electrically conductive relation with said first terminal, an electrically conductive supporting element carried by said holder in electrically conductive relation with said lever, a second fuse holder having a terminal at the upper end thereof, means including a second toggle lever pivotally supporting said second holder on said supporting element and normally releasably latched by a fuse link in said second holder to maintain said second holder in closed position with said third mentioned terminal engaging the said second terminal on said first holder, said second fuse link being arranged for connection between said third terminal and said supporting element and said second holder being movable to open position without movement of said first holder to open position, and switching mechanism carried by said supporting element and operative automatically upon movement of said second holder to open position for completing an electric connection between said lower contact and the fuse link in said first holder.

11. In an electric switching device, two contacts in insulated spaced relationship, a first switch element, means supporting said element removably in closed position relative to said contacts, said element having a conductor electrically disconnected at at least one end from one of said contacts, a second switch element including a conductor, means for supporting said second element on said first element with said second element in closed position and said second conductor electrically connected between said contacts, said second element being movable relative to said first element to open position without effecting movement of said first element from closed position, and circuit reclosing mechanism operative to complete connection of said first conductor between said contacts in response to movement of said second element relative to said first element to open position, said first element being operative to disconnect both of said elements from at least one of said contacts upon movement of the first element to open position.

12. In an electric switching device, a switch support having spaced terminals, a plurality of switch elements, means removably supporting said elements on said supporting structure, means releasably restraining said elements concurrently in operative positions for electric connection of conductors of the respective elements between said terminals, one of said elements when in operative position having a conductor electrically disconnected at at least one end from one of said terminals when another of said elements is in operative position, said one element being operative, upon movement thereof to open position, to effect movement of all said elements to open position, said supporting and restraining means providing for movement of said other element relative to said one element to open position without effecting movement of said one element to open position, and circuit reclosing mechanism operative when said one element is in operative position to complete connection of the conductor of said one element between said terminals in response to movement of said other element relative to said one element to open position.

GEORGE F. LINCKS.